G. W. Gregory,
Grapple.
No. 2,784. Reissued Oct. 22, 1867.
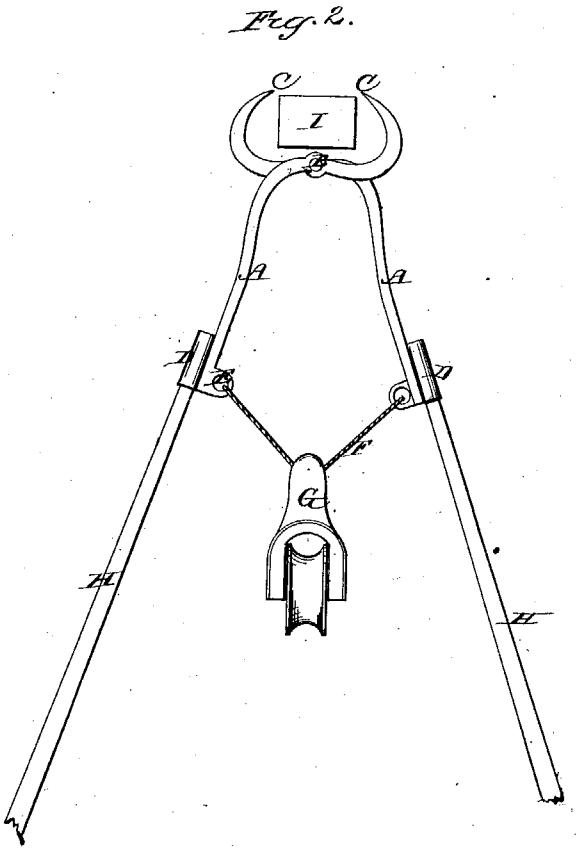
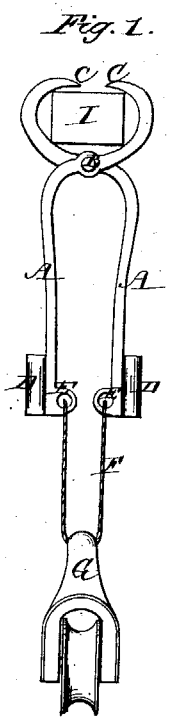
Witnesses
Thos. Stetson Jr.
John D. Bloor
Inventor
Geo. W. Gregory
N. PETERS, PHOTO-LITHOGRAPHER, WASHINGTON, D. C.

United States Patent Office.

GEORGE W. GREGORY, OF WATERTOWN, NEW YORK.

*Letters Patent No.* 57,125, *dated August* 14, 1866; *antedated February* 14, 1866; *reissue No.* 2,784, *dated October* 22, 1867.

IMPROVEMENT IN PULLEY ATTACHMENT FOR RAISING WEIGHTS.

The Schedule referred to in these Letters Patent and making part of the same.

TO ALL WHOM IT MAY CONCERN:

Be it known that I, GEORGE W. GREGORY, of Watertown, Jefferson county, and State of New York, have invented certain new and useful improvements in the Manner of Adjusting Pulleys for Hay-Forks and other Purposes to Beams or Rafters; and I do hereby declare that the following is a full, clear, and exact description thereof, reference being had to the annexed drawings, and to the letters of reference marked thereon, like letters indicating like parts, and in which—

Figure 1 is a perspective view of my grapple or adjustable pulley-support hooked on the beam and supporting a pulley, and Figure 2 is a perspective view of the grapple or support opened and being hooked on the beam.

In operating hay-forks it is necessary that one of the pulleys shall hang over that portion of the bay where the hay is to be deposited, and in large barns it is necessary to change the position of the pulley from time to time, in order to distribute the hay in all parts of the bay.

Heretofore the pulley has either been supported by a screw-hook screwed into the beam or rafter, or by a cord or chain passed around the beam or rafter, and in both cases the operator, before using the fork, has been obliged to ascend in some manner into the peak of the barn, and with a bit bore a hole for the hook and screw the hook therein, or pass a chain or rope around the beam or rafter, to which hook, chain, or rope the pulley was then attached. The ascent must be made as often as it becomes necessary to change the pulley, and is often, in high barns, quite dangerous and always inconvenient.

My invention therefore consists in supporting the pulley or pulleys by means of a cord or chain attached to an adjustable pulley-support, which is provided with one or more sockets, or their equivalents, in which poles may be inserted, and the grapple or support changed, by the operator standing below, from place to place, as may be desired, thus obviating the danger and inconvenience above stated.

In order to enable others to make and use my invention, I will proceed to describe its construction and operation.

The adjustable pulley-support is composed of two bent arms, A A, pivoted together at B, and having the part C C curved and pointed sufficient to surround a beam or rafter or to fasten in its sides. The part marked I is intended to represent a beam. The lower ends of arms A A are provided with suitable sockets and rings, D and E, the former to receive poles H H, by which the pulley-support is operated and changed from place to place, and the latter to which the cord or rope F is attached that supports the pulley G.

The chain or cord is first passed through the eye of the pulley, the chain is then fastened to eyes E, and poles H are inserted in sockets D, and the pulley-support with the pulley attached is raised into the peak, opened and closed over the beam whenever desired. The poles may then be removed. The weight of the pulley, and the weight of the fork and hay on the cord passing over the pulley, tend to keep the pulley-support close to the beam.

I am aware that grapples have been constructed similar in their general appearance to the one shown by me, but none, so far as I am aware, have been provided with a tube or socket and used for this purpose. I do not therefore claim a grapple constructed as herein described, neither do I desire to confine myself to the precise construction herein described, but what I claim, and desire to secure by Letters Patent, is—

1. An adjustable pulley-support, having one or more sockets, or their equivalents, by and through which the pulley-support may be operated and changed from place to place, for the purpose set forth.

2. An adjustable pulley-support, provided with means for changing the same from place to place, and with means for supporting the pulley.

GEO. W. GREGORY.

Witnesses:

ORAN G. OTIS,

JOHN KIRBY.